United States Patent [19]

Davison et al.

[11] 4,310,577

[45] * Jan. 12, 1982

[54] LIQUID CRYSTAL FILM LAMINATE

[75] Inventors: Thomas W. Davison, Algonquin; Fred K. Suzuki, Arlington Heights, both of Ill.

[73] Assignee: Liquid Crystal Products, Inc., Arlington Heights, Ill.

[*] Notice: The portion of the term of this patent subsequent to Jul. 17, 1996, has been disclaimed.

[21] Appl. No.: 69,386

[22] Filed: Aug. 24, 1979

[51] Int. Cl.³ .............................................. B44F 1/00
[52] U.S. Cl. ...................................... 428/1; 428/40; 428/215; 428/220; 428/480; 428/906
[58] Field of Search ................ 428/1, 40, 906, 215, 428/220, 480

[56] References Cited

U.S. PATENT DOCUMENTS

| | | | |
|---|---|---|---|
| 3,533,399 | 10/1970 | Goldberg | 428/1 |
| 3,585,381 | 6/1971 | Hodson | 428/1 |
| 3,600,060 | 8/1971 | Churchill | 428/1 |
| 3,620,889 | 11/1971 | Baltzer | 428/1 |
| 3,661,142 | 5/1972 | Flam | 428/1 |
| 3,697,297 | 10/1972 | Churchill | 428/1 |
| 3,872,050 | 3/1975 | Benton | 428/1 |
| 3,998,210 | 12/1976 | Nosari | 428/1 |
| 4,032,687 | 6/1977 | Hornsby | 428/1 |
| 4,043,324 | 8/1977 | Shaw | 428/1 |
| 4,161,557 | 7/1979 | Suzuki | 428/1 |

FOREIGN PATENT DOCUMENTS 161039  8/1969  United Kingdom .................... 428/1

OTHER PUBLICATIONS

"Continuous Production of Laminated Cholesteric Liquid Crystal Films", Dixon et al., (unprinted).

*Primary Examiner*—Marion McCamish
*Attorney, Agent, or Firm*—Gerlach, O'Brien & Kleinke

[57] ABSTRACT

A liquid crystal film laminate embodies an indicator component and a supportive and protective component removable from the indicator component to provide maximum flexibility and minimum mass in the resulting indicating article. The indicator component includes a liquid crystal film and may include a protective layer and/or an adhesive layer. The film has an outer surface which forms one of two opposite side surfaces on the indicator component. The supportive and protective component includes two release surfaces provided by at least one release sheet, such release surfaces separably contacting respective ones of the indicator component side surfaces in covering relation thereto, for removably supporting and protecting the indicator component. The outer surface of the film thereby is exposed to unobstructed view upon removal of the supportive and protective component, for maximum clarity of the indication given by the film. The maximum total thickness of the indicator component preferably is about 4 mils.

16 Claims, 4 Drawing Figures

U.S. Patent
Jan. 12, 1982
4,310,577
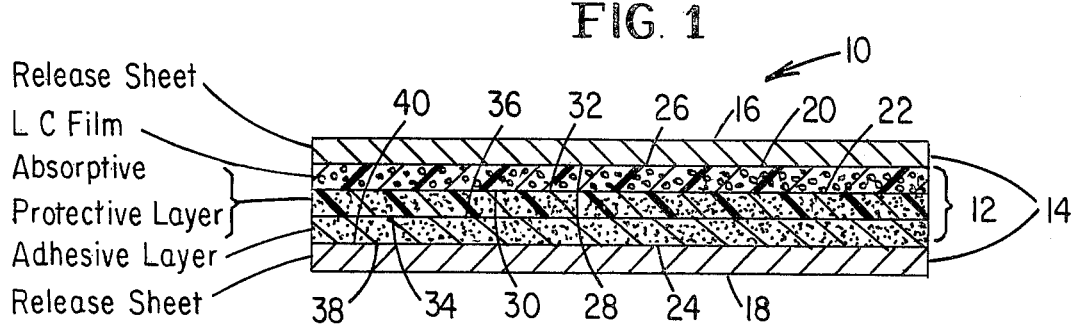
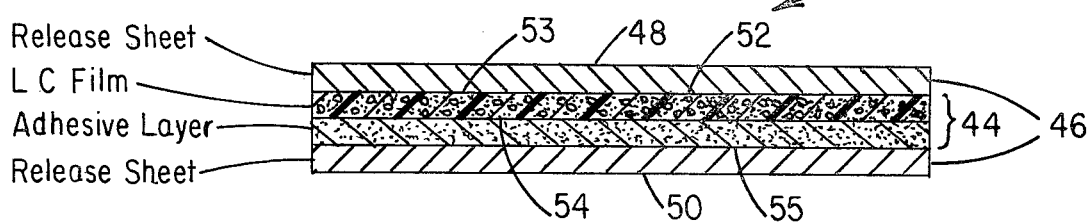
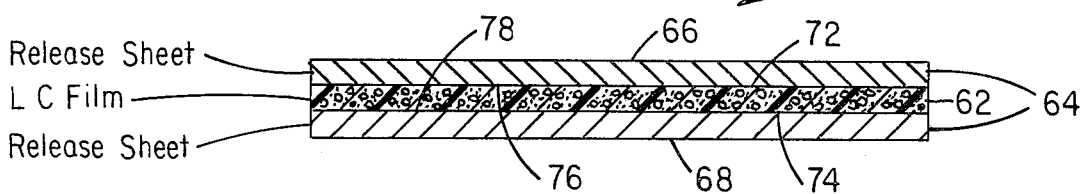
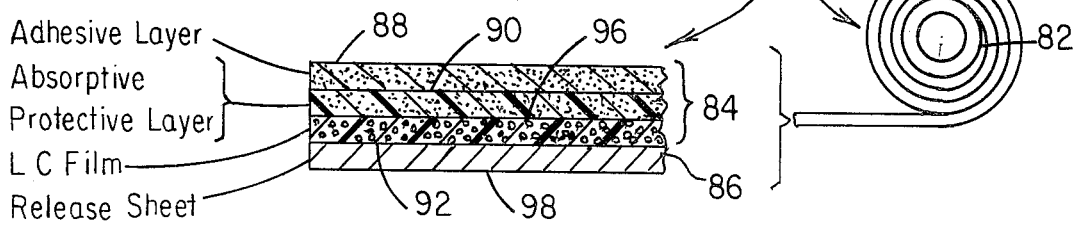

LIQUID CRYSTAL FILM LAMINATE

BACKGROUND OF THE INVENTION

This invention relates to liquid crystal film laminates. More particularly, the invention relates to a liquid crystal film laminate which embodies an indicator component and a supportive and protective component removable therefrom.

Cholesteric liquid crystalline phase materials, also referred to as cholesteric liquid crystals and herein referred to for convenience at times simply as "liquid crystals," are a class of compounds that display a cholesteric mesophase or are in a cholesteric mesomorphic state within certain temperature limits. The compounds, their properties and their uses are well known, and they are described in our U.S. Pat. No. 4,161,557 and in the references cited therein, among others. As described in the patent, the liquid crystals in the cholesteric mesophase reflect light, the dominant wave length of which is affected by stimuli applied to the liquid crystals, such as heat, physical stress, electricity, magnetism, and radiation, which are types of applied energy, the presence of other materials, which may be present as contaminants, and materials present in the environment and which act upon the liquid crystals.

An important property of the individual cholesteric liquid crystalline phase materials and of mixtures of different materials is that, all other conditions being equal, they always display the same color at a specific temperature. The characteristic color is changed by the application of one of the above-described stimuli, furnishing a direct, visible response which may be utilized in a detector system. A stimulus either can interact directly with the liquid crystals, or can be converted into a stimulus which does interact. The color responses to stimuli are utilized in systems for measuring and/or detecting specific temperatures and temperature changes, detecting radiation, measuring stress, monitoring the presence of gases and vapors, and other purposes.

The temperature sensitivity of the liquid crystals finds important use in thermometers and thermographic systems. In general, when viewed against a black absorptive background color, the liquid crystals change in color from red to green to blue to violet with increasing temperature in the mesophase temperature range, and the reverse color change takes place with decreasing temperature therein. Above and below the mesophase temperature range, the liquid crystals assume the color of the background.

Liquid crystals must be protected or shielded from the atmosphere unless they are used only for a relatively short period of time. Exposure to the atmosphere results in oxidation, causing the liquid crystals to deteriorate. Foreign particles from the atmosphere provide sites for crystallization and alter the delicately balanced mesomorphic state of the liquid crystals. Ultraviolet radiation may cause deterioration of the liquid crystals.

For protection against such exposure, protection against physical contacts, cleanliness, convenience in handling, and other reasons, liquid crystals in the past have been enclosed in various ways. In particular, liquid crystal-containing coatings, layers, films, sheets and the like have been provided, wherein the liquid crystals are protected by encapsulation or by dispersion in plastic materials. The liquid crystals have been encapsulated in gelatin-gum arabic, polyvinyl alcohol, zein, or other substances, such as disclosed in U.S. Pat. Nos. 3,585,381 and 3,697,297. Discrete naked aggregates of the liquid crystals have been dispersed in a substantially continuous solid polymeric matrix by drying an emulsion of the liquid crystals in an aqueous solution of a polymer such as polyvinyl alcohol or a polyacrylate, as disclosed in British Pat. No. 1,161,039, published Aug. 13, 1969, and U.S. Pat. No. 3,600,060, and by forming an organic solvent solution of a polymer and the liquid crystals, and removing the solvent to form a film or layer, suitable polymers including polyvinyl butyral, acrylic resin, styrene resins, polyester resins, epoxy resins, polyvinyl chloride, polyvinyl acetate, and polycarbonate, as disclosed in U.S. Pat. No. 3,620,889, and polyurethane, as disclosed in U.S. Pat. No. 3,872,050. The aforementioned U.S. Pat. No. 4,161,557 discloses an improvement in the manufacture of a polyvinyl butyral film having liquid crystals dispersed therein, which results in accentuated intensity and contrast of visible light waves reflected by the liquid crystals in the film.

In practical application, liquid crystals although protected by dispersion of naked aggregates thereof in a film or layer of a film-forming polymer, or by encapsulation and additionally by dispersion of the liquid crystal-containing capsules in a film or layer of a film-forming polymer, have been supported and protected by an additional sheet or strip of plastic material, the sheet or strip being permanently affixed to the liquid crystal film or layer. An indicator article having the foregoing makeup is disclosed in U.S. Pat. No. 3,998,210. Additional articles of the foregoing makeup are described in U.S. Pat. No. 3,661,142 and in an unprinted publication of Dixon, Westervelt and Scala, entitled "Continuous Production of Laminated Cholesteric Liquid Crystal Films," which articles additionally include a protective film or layer of a film-forming polymer over the liquid crystal layer on the opposite side from the supporting sheet or strip.

The supporting sheets or strips employed in the past have been relatively thick and inflexible, causing the indicator articles to separate from uneven surfaces. The overall mass of the indicator articles has been excessive, resulting in diffuse coloration and reduced accuracy of temperature response. When a liquid crystal layer is to be viewed through a sheet, strip or film which protects an exposed surface of the layer, the clarity of the color response is reduced, i.e., the intensity of the reflected or scattered color is lowered and the color contrast is diminished, limiting the definition which may be achieved in making various studies and analyses. As a result, the prior articles have not been widely accepted for use in applications where they must be employed in intimate contact with uneven surfaces and/or where they must produce accurate, clear and well-delineated color responses to applied energy, in particular, in thermometric and/or thermographic applications on skin surfaces of the human body.

SUMMARY OF THE INVENTION

The invention provides a liquid crystal film laminate or package which furnishes the support and protection needed for a liquid crystal film-containing indicator component prior to use, and, in use, reduces to such component serving as an indicator article and having maximum flexibility and clarity, and minimum mass.

More particularly, the invention provides a liquid crystal film laminate which embodies an indicator component and a supportive and protective component removable therefrom. The indicator component includes a discrete flexible liquid crystal film, and the supportive and protective component includes two release surfaces provided by at least one release sheet, which surfaces contact and cover opposite side surfaces of the indicator component.

The supportive and protective component is a dual functioning component of the laminate, serving both to support and protect the indicator component prior to use, and to render the indicator component separable from elements which no longer are needed for such purposes when the indicator component is performing its indicating function, thereby enabling the component to perform most effectively. Thus, the indicator component is supported by a release sheet or sheets and protected thereby from mechanical injury, from contamination with foreign matter, and, if desired, from radiation prior to use of the component, and the indicator component and the release sheet or sheets are conveniently separated from each other for such use.

As indicated above, maximum clarity of color response is achieved when an outer surface of the liquid crystal film is exposed to unobstructed view. However, liquid crystals in plastic films tend to bleed out of the films at their surfaces, creating sites where crystallization can be seeded. The tendency varies with the film-forming polymer and the type of liquid crystal dispersion therein, but the problem is such that the liquid crystal films preferably have their surfaces covered and protected by a protective or barrier coat, layer, film or substrate. In the present invention, the liquid crystal film is supported and protected by a release sheet or sheets until it is to be used, whereupon the release sheet or sheets may be removed to expose an outer surface of the film directly to the atmosphere to provide an unobstructed view of the surface.

Removable support may be provided in this manner for the thinnest of liquid crystal films or film assemblies forming the indicator component, thus providing the most flexible indicator component, reducing its mass to a minimum, and affording a color response of maximum clarity. Very thin and generally frangible films or film assemblies suitable only for a single use may be made available in this manner, after which use they must be discarded, thereby preventing cross-contamination.

The indicator component may include a flexible protective film-forming polymer layer or film on an inner surface of the liquid crystal film, for preventing contamination by a surface on which the indicator component is mounted. In view of the support and protection provided by the supportive and protective component of the laminate, such protective layer may be very thin and flexible, to enable the indicator component to follow uneven and irregular contours, while also keeping the mass low. The protective layer may function at the same time as a light-absorptive layer providing color contrast, by incorporating a light-absorptive substance in the polymer serving as a matrix.

A flexible adhesive layer may be included in the indicator component, for attaching the component to a surface. The adhesive layer may be placed on the inner surface of the foregoing protective layer, or on the inner surface of the liquid crystal film in the absence of the protective layer. The adhesive layer may be very thin, to maintain high flexibility and low mass in the indicator component.

In providing an indicator component having high flexibility and low mass, it is preferred that the maximum total thickness of the indicator component be about 4 mils. In comparison, it will be noted that the indicator article numbered 11 in the above-identified U.S. Pat. No. 3,998,210 has a plastic backing numbered 21, which alone has an indicator thickness of 3 mils, while the first layer numbered 27 has a thickness of approximately 4 mils, and the second layer numbered 29 has a thickness of approximately 2 mils.

Certain of the disclosures in our above-identified U.S. Pat. No. 4,161,557 are common to the present application. However, the patent is directed to an improvement wherein a substance is added to a liquid crystal-polyvinyl butyral polymer film-forming composition, resulting in a film exhibiting accentuated intensity and contrast of visible light waves reflected by the liquid crystals, such substance being a member selected from the group consisting of oil-modified alkyd-type polymeric plasticizing resins and castor oil. The present invention is directed to a liquid crystal film laminate embodying an indicator component and a supportive and protective component removable therefrom, as described above, without regard to such an addition made to a composition of liquid crystals and film-forming polymer, and the invention is not limited to a particular polymer.

BRIEF DESCRIPTION OF THE DRAWINGS

FIGS. 1-3 are schematic cross-sectional views of respective preferred embodiments of the liquid crystal film laminate of the invention, the laminate being made in flat form in each of the embodiments; and FIG. 4 is a schematic partly elevational and partly cross-sectional view of another embodiment of the liquid crystal film laminate of the invention, the laminate being made in roll form in such embodiment.

DESCRIPTION OF THE PREFERRED EMBODIMENTS

The liquid crystal film laminate or package 10 of FIG. 1 is useful especially where it is desired to protect a liquid crystal film from contamination by the surface to which it is affixed and/or where it is preferred that a light-absorptive substance or substances serving to improve color contrast be applied on the inner surface of or behind the film. The laminate 10 includes an indicator component 12, illustrated as composed of the layers encompassed by the bracket so-identified. The indicator component 12 is enclosed within a supportive and protective component 14, which is constituted of two release sheets or liners 16 and 18 disposed on opposite sides of the indicator component 12. The indicator component 12 includes, in successive contacting layers, a discrete flexible liquid crystal film 20, a flexible light-absorptive protective layer 22, and a flexible adhesive layer 24.

The layer crystal film 20 has an outer surface 26 which forms one of two opposite side surfaces on the indicator component 12, and which contacts a release surface 28 on one release sheet 16, with the release surface 28 in covering relation to the outer surface 26. The liquid crystal film 20 has an inner surface 30 which contacts an outer surface 32 on the light-absorptive protective layer 22. The light-absorptive protective layer 22 has an inner surface 34 in contact with an outer surface 36 on the adhesive layer 24. An inner surface 38 on the adhesive layer 24 forms the remaining one of the opposite side surfaces on the indicator component 12, and it contacts a release surface 40 on the remaining release sheet 18. The identification of the surfaces of the elements of the indicator component 12 as "outer" or "inner" has reference to their dispositions as the component is applied to the surface of another object, in use.

In use, the release sheet 18 covering the adhesive layer 24 is separated therefrom, as by peeling off the release sheet, and the adhesive layer is placed on a surface to be tested or monitored. A finger or fingers of the hand, or an instrument may be pressed against the outer surface of the remaining release sheet 16, to cause the adhesive layer 24 to adhere to the surface to be tested over the entire area covered by the laminate, especially when the surface is uneven or irregular. Thus, for example, both relatively narrow strips and relatively widespread sheets may be adhered to skin surfaces of the body in intimate contact therewith in this manner. Then, the remaining release sheet 16 is peeled or stripped from the liquid crystal film 20 on the outside of the indicator component 12, to leave the indicator component in place on the test surface, where it serves as an indicator article. Removal of the release sheet 16 exposes the outer surface 26 of the film directly to the atmosphere to provide an unobstructed view of the surface. The light-absorptive protective layer 22 serves to prevent contamination of the liquid crystal film 20 by body oils and other contaminants, while providing color contrast. When the indicator component 12 has performed its function, it may be peeled from the test surface and discarded.

FIG. 2 illustrates a liquid crystal film laminate 42, which includes an indicator component 44 and a supportive and protective component 46 enclosing the indicator component. The supportive and protective component 46 is made up of two release sheets 48 and 50 similar to the release sheets 16 and 18 illustrated in FIG. 1. The indicator component 44 includes a discrete flexible liquid crystal film 52 having outer and inner surfaces 53 and 54, respectively, similar to the liquid crystal film 20 illustrated in FIG. 1, but, additionally, having a light-absorptive substance dispersed therein. There is no protective layer similar to the light-absorptive protective layer 22 of FIG. 1, but an adhesive layer 55 like the adhesive layer 24 of FIG. 1 is in contact with the inner surface 54 of the liquid crystal film 52, and the film and the adhesive layer constitute the indicator component 44. The laminate 42 may be employed similarly to the laminate 10 of FIG. 1, in instances where a protective layer is not needed, such as where the liquid crystal film 52 is more resistant to contamination and/or the surface to which the indicator component 44 is to be affixed is not likely to contaminate the liquid crystal film substantially during the period of use.

FIG. 3 illustrates a liquid crystal film laminate 60, which includes a liquid crystal film 62 constituting an indicator component, and a supportive and protective component 64. The supportive and protective component 64 is made up of two release sheets 66 and 68 similar to the release sheets of the preceding embodiments. The film 62 is a discrete flexible liquid crystal film having a light-absorptive substance dispersed therein, and it is similar to the liquid crystal film 52 of FIG. 2. The outer and inner surfaces 72 and 74 of the liquid crystal film 62 are in contact with release surfaces 76 and 78 on the sheets 66 and 68, respectively, with the release surfaces in covering relation to the film surfaces.

The embodiment of FIG. 3 may be used where a protective layer is not needed, similarly to the embodiment of FIG. 2. Also, the outer and inner surfaces 72 and 74 of the liquid crystal film 62 may be reversed, i.e., either surface may be displayed for viewing while the other surface is disposed adjacent to a test surface, to which the film 62 is affixed. The test surface may be provided with a coat or layer of adhesive, which may be sprayed thereon. To affix the liquid crystal film 62, one of the release sheets 66 and 68 is removed, the film is placed against the surface of the adhesive coat, pressing on the remaining release sheet as necessary, and the remaining release sheet is removed for viewing the liquid crystal film. Alternatively, when circumstances permit, the liquid crystal film 62 may be taped to a surface after removing the release sheets, or the film may be attached to an object or instrumentality by other suitable means.

In another embodiment, not illustrated, the adhesive layer 24 of the laminate 10 in FIG. 1 may be omitted, and the resulting laminate may be affixed or mounted for test purposes as described for the embodiment of FIG. 3. In further embodiments, also not illustrated, a protective layer like the layer 22 of FIG. 1 but not having substantial light-absorptive properties may be added to the embodiments of FIGS. 2 and 3, being provided between the liquid crystal film 52 and the adhesive layer 55 in the embodiment of FIG. 2, and being provided on either of the liquid crystal film surfaces 72 and 74 in the embodiment of FIG. 3.

FIG. 4 illustrates a liquid crystal film laminate 80 in roll form, with a portion of the laminate unrolled for removal and use of the portion. The laminate 80 is illustrated as being rolled on a tubular core 82 of any suitable material, such as heavy paper or plastic. The laminate 80 includes an indicator component 84 on the inside of the roll or adjacent to the core 82, and a release sheet 86 constituting a supportive and protective component on the outside of the roll. The indicator component 84 is constituted of a flexible adhesive layer 88 next to the core 82, a flexible light-absorptive protective layer 90 in contact with the outer surface of the adhesive layer, and a discrete flexible liquid crystal film 92 in contact with the outer surface of the absorptive and protective layer. The release sheet 86 is in contact with the outer surface of the liquid crystal film 92, and when rolled, also is in contact with the inner surface of the adhesive layer 88. The release sheet 86 is provided with an inner release surface 96 for removable contact with the liquid crystal film 92 on its outer surface, and with an outer release surface 98 for removable contact with the adhesive layer 88 on its inner surface, in covering relation of the release surfaces to the surfaces in contact therewith.

The illustrative roll form of the laminate 80 is a convenient form for severing the laminate in portions of various lengths, as needed. It has the added convenience of exposing the adhesive layer 88 when unrolled, ready for affixing the severed portion of the indicator component 84 to a surface, after which removal of the release sheet 86 exposes the outer surface of the liquid crystal film 92 directly to the atmosphere for viewing. The liquid crystal film 92 in the remainder of the laminate 80, not being used, continues to be supported and protected. The roll form also has advantages in packaging, shipment and storage, and it minimizes the consumption of materials.

Cholesteric liquid crystalline phase materials or liquid crystals which may be employed in the invention are well-known and readily may be selected for intended uses following the teachings of the prior art, including the patents and publication cited above. Thus, for example, liquid crystals which may be employed are described in detail in U.S. Pat. Nos. 3,114,836, 3,441,513, 3,533,399, and 3,594,126. Most commonly, two, three or four-component liquid crystal compositions are employed, for providing a desired color response, and a mesophase or color-play temperature range at a desired temperature level and having a suitable width of temperature range. Preferably, the liquid crystals are selected to provide a color response in the mesophase range changing with increasing temperature from red through orange, yellow, green, and blue to violet in the visible spectrum, as a result of light reflectance or scattering by the liquid crystals. In general, enantiotropic liquid crystals are preferred, although the invention is not limited thereto. Reference to an "enantiotropic" material means a liquid crystal which forms, or a mixture of liquid crystals which together form the cholesteric mesophase either by heating the material in its crystalline solid phase or by cooling the material in its isotropic liquid phase.

Preferred liquid crystals include the cholesteryl, dicholesteryl, cholestanyl, and sitosteryl organic esters, halides and alkyl carbonates. Further preferred liquid crystals are listed in Table 1 of U.S. Pat. No. 4,161,557, and compositions preferred for certain uses as described therein are listed in Table 2 thereof.

Preferably, the liquid crystal film comprises the liquid crystals in the form of finally divided naked aggregates dispersed throughout a film-forming polymer matrix. The dispersed liquid crystal particles are smaller than can be resolved under a light microscope, i.e., their diameter is less than about 1 micron. Liquid crystal films of this type may be prepared as described in U.S. Pat. Nos. 4,161,557, 3,620,889 and 3,872,050, for example. Films with outstanding color intensity and contrast are produced according to the former patent. Alternatively, the liquid crystals may be encapsulated and dispersed in a film-forming polymer matrix or binder while in the encapsulated condition, as described in U.S. Pat. Nos. 3,585,381 and 3,697,297.

Film-forming polymers such as described in the foregoing patents may be employed in the liquid crystal film, and also in the protective layer or film, where the latter is provided. The same polymer or different polymers may be employed in the respective films. Thus, for example, film-forming polymers which may be employed in either case include polyvinyl butyral, polyurethane, acrylic resins or polyacrylates, polyvinyl alcohol, polyvinyl acetate, polyvinyl chloride, polystyrene, polycarbonate, and epoxy resins. Liquid crystals are dispersed in the polymers as naked aggregates in a proportion preferably in the range of about 20-75% by weight of the complete composition to provide the liquid crystal films. Bromobutyl rubber may be employed as the film-forming polymer in either case, with the naked aggregates dispersed therein in a proportion preferably in the range of about 40-80% by weight of the composition to provide a liquid crystal film. Preferred polymers are polyvinyl butyral, polyurethane, and acrylic resins. Similarly, film-forming polymers are employed as binders for the encapsulated liquid crystals, as described in the above-identified U.S. Pat. Nos. 3,585,381 and 3,697,297.

In order to improve color contrast, the liquid crystals commonly are viewed against an absorptive background, particularly a black background, which serves to absorb the transmitted light. For this purpose, a light-absorptive substance is dispersed in a matrix of the film-forming polymer forming the protective layer, in a preferred embodiment. Alternatively, a light-absorptive substance may be dispersed in the liquid crystal film. The light-absorptive substances include dyes and pigments, as disclosed in various of the above-identified patents. Thus, the liquid crystal film may be provided with oil-soluble dyes, as disclosed in U.S. Pat. No. 4,015,591, or with a carbon black powder in a proportion in the range of about 0.1% to 5% of the sum of the weights of the liquid crystals and the powder. Dyes or pigments may be dispersed similarly in the protective layer.

The adhesive layer preferably is a layer of an oil-free pressure-sensitive adhesive, which is provided on the protective layer when employed, and otherwise, on one surface of the liquid crystal film. Suitable adhesives include polyvinyl acetate and polyacrylates.

The release sheet or liner preferably is a flexible sheet member having a release agent thereon, the materials of which are conventional and commercially available. Preferred flexible sheet members are cellulosic sheets, including paper and regenerated cellulose and the like, film-forming polymer sheets, and laminates of cellulosic sheets and film-forming polymer sheets. Preferred film-forming polymer sheets include polyolefin sheets, more preferably, polyethylene and polypropylene sheets, and polystyrene, polyvinyl, and polyester sheets. Most advantageously, the sheet members are peelable, for rapid and convenient separation from the remainder of the laminate. The flexible sheet members preferably are coated on one or both sides with a release substance or agent, such as a silicone resin, a mold release compound, particularly polyvinyl alcohol, or stearato chromic chloride.

In a preferred method of providing a laminate such as illustrated in one of FIGS. 1–3, the liquid crystal film is cast directly upon a release sheet. Alternatively, a release sheet may be pressure-laminated on the exposed surface of a liquid crystal film which has been cast or coated on another, oil-free surface. A coating solution of the film-forming polymer and the liquid crystals in a suitable volatile solvent may be cast or coated by knife, roller, brush or spray coating, from which the solvent is evaporated to provide a dry film. Films are formed in suitable known ways when two-component prepolymer mixtures are employed, for example, as described for polyurethane in U.S. Pat. No. 3,872,050. The liquid crystal film preferably has a thickness of about 0.2-4 mils. The film thickness preferably is in the range of about 0.02-2 mils when employed with a protective layer of a polymeric film, more preferably, about 0.5-1.5 mils.

The protective layer or coat may be deposited on the liquid crystal film, in a manner similar to the deposit of the liquid crystal film, or may be heat and/or pressure laminated thereon. When a casting procedure is employed, it is preferred to apply a polymer which is soluble in a solvent in which the liquid crystal is not soluble, to prevent the solvent from extracting the liquid crystal into the protective coat. Thus, for example, polyvinyl butyral may be deposited from solution in a polar organic solvent such as methanol, and polyvinyl alcohol may be deposited from aqueous solution, in neither of which polar solvents are liquid crystals soluble.

For lamination, the protective coat may be cast on a release sheet. The release sheet with the dry coat thereon may be inverted over the liquid crystal film, and heat and pressure may be applied to the back of the sheet, by hot rollers or other suitable means, to cause the protective coat to become fused to the exposed surface of the liquid crystal film. The release sheet may be allowed to remain in place, as part of the final laminate. Alternatively, the release sheet may be removed, for further deposition or lamination of an adhesive layer on the protective coat. As described above, the protective coat in preferred embodiments includes a light-absorptive substance, which is dissolved or dispersed in the casting solution. The protective layer when employed is provided in a preferred thickness of about 0.1-2 mils, more preferably, about 0.3-1.5 mils.

The adhesive layer may be provided on the protective layer or directly on the liquid crystal film, according to the requirements for the laminate, and covered by a release sheet, in a conventional manner. Thus, for example, the adhesive layer may be coated on one of the foregoing layers to provide a dry layer of the adhesive in the preferred range of about 0.1-2 mils. Alternatively, a similar layer on a release sheet may be applied by lamination, with heat and pressure applied to the back of the release sheet. The release sheet is allowed to remain on the adhesive layer as part of the laminate of the invention, until time for application of the adhesive layer to the surface on which the indicator component of the laminate is to be mounted.

The laminate 80 of FIG. 4 may be produced by similar techniques. Thus, for example, the liquid crystal film 92 may be cast on the release sheet 86, the protective layer 90 may be cast on the film 92, and the adhesive layer 88 may be cast on the protective layer 90. Other alternatives include laminations accomplished by transfer of layers from other release sheets, removing such sheets thereafter. Techniques similar to the examples which follow may be employed.

The release sheets are provided in the final laminate in one of the ways described above, or, if not, they may be heat and/or pressure-laminated to one or both of the outside surfaces of the indicator component. The release sheets support and protect the liquid crystal film, the protective layer, and the adhesive layer, while being removable to eliminate the limitations on flexibility imposed by supportive and protective members and the mass thereof, and to expose a surface of the liquid crystal film directly to the atmosphere for maximum clarity in viewing. In a specific embodiment of the invention providing additional utility, a release sheet adjacent to an otherwise unobstructed surface of the liquid crystal film may be formed of light-transmitting plastic, to give a relatively broad or general indication of the condition of the object or instrumentality to which the indicator component is attached or otherwise exposed, while the outer surface of the liquid crystal film remains covered and protected. The light-transmitting release sheet is removed subsequently, when precise evaluation is required.

In use, the preferred technique for applying the indicator components 12 and 44 of the flat form laminates 10 and 42 illustrated in FIGS. 1 and 2, respectively, is to first remove the release sheet 18 or 50 adjacent to the adhesive layer 24 or 55, and next apply the remainder of the laminate with the adhesive layer against the surface to be tested, such as a skin surface or the surface of an inanimate object. The remaining, outer release sheet 16 or 48 may be pressed by a finger or fingers, or by an instrument, to place the adhesive layer in intimate contact with the surface. Thereafter, the outer release sheet 16 or 48 is peeled off of the outer surface 26 or 53 of the liquid crystal film 20 or 52, as the case may be, and the surface is viewed directly. This technique is especially valuable in medical applications, such as for vein location prior to venipuncture, as disclosed in our pending U.S. patent application Ser. No. 889,284, filed Mar. 23, 1978, now U.S. Pat. No. 4,175,543, and for thermal mapping of regions of the body, as in breast thermography and placental studies.

The laminate 60 of FIG. 3 may be employed similarly. When it is desired to adhere the liquid crystal film 62 to a surface, the surface may be provided with a thin coat or layer of an adhesive, and, following removal of one of the release sheets 66 and 68, the exposed surface of the film is applied thereon. Then, the remaining release sheet is removed for viewing. When the roll form laminate 80 of FIG. 4 is used, the outer end of the laminate is exposed, a portion of the laminate is severed, the portion is adhered to a surface by the adhesive layer 88, and in the severed portion, the release sheet 86 is peeled off of the liquid crystal film 92 for viewing.

The laminates may be provided in the form of relatively large flat and rolled sheet-like assemblies, or in the form of relatively small tapes and labels. So long as the release sheets provide protection, the laminates have relatively long shelf lives. When a surface of the liquid crystal film is exposed directly to the atmosphere by removal of a release sheet therefrom, the indicator component may be used for various purposes for two or three days, without need for protection against bleeding and crystallization, or against ultraviolet radiation.

The following examples illustrate preferred embodiments of the liquid crystal film laminate of the invention. It is to be understood that the invention is not limited to the materials, proportions, conditions and procedures employed in the examples, which are merely illustrative.

EXAMPLE 1

An elastic liquid crystal film is formed in the following manner, according to the method of U.S. Pat. No. 4,161,557. A 27-gram quantity of a liquid crystal mixture is dissolved in a 77-gram quantity of toluene. The liquid crystal mixture contains, in percent by weight, 47% cholesteryl nonanoate (CN), 43% cholesteryl oleyl carbonate (COC), 7% dicholesteryl carbonate (DCC), and 3% cholesteryl chloride (CCl), such composition having a mesophase temperature range of 30°-33° C. A 50-gram quantity of isopropyl alcohol is added slowly with agitation. A 4-gram quantity of an oil-modified azaleic acid plasticizing alkyd resin (Paraplex RGA-8, Rohm and Haas Co.), and a 4-gram quantity of polyoxyethylene aryl ether (Pycal 94, ICI United States, Inc.) are added (see U.S. Pat. No. 4,161,557 for further properties of these materials). A 15-gram quantity of polyvinyl butryal (Butvar B-72, Monsanto Polymers & Petrochemicals Co.) is added slowly during high shear agitation and dissolved over a period of two hours. The polyvinyl butyral grade has an average of molecular weight of 180,000-270,000, a viscosity of 8,000-18,000 centipoises, and, in approximate proportions by weight, 80% polyvinyl butyral, 17.5-21% polyvinyl alcohol, and 0-2.5% polyvinyl acetate.

The resulting solution is knife-coated in a wet thickness of 10 mils on a release sheet of a clear polyester sheet (Mylar) 2 mils thick, coated with a silicone release agent (Poly Slik S, No. 2004, H. P. Smith Paper Co.). A 1-mil dry liquid crystal film is formed on the release sheet upon air-drying at about 20° C. for 24 hours. Alternatively, the release sheet may be a 2-mil thick clear polyester sheet (Mylar) coated with a polyvinyl alcohol mold release in a wet thickness of 2 mils, and dried for 24 hours at 20° C. The mold release is Plastilease 512B (Ram Chemical Co.), polyvinyl alcohol dissolved in a 70% isopropyl alcohol-water solution.

A black light-absorptive protective film or layer is formed by mixing 3 grams of a 60% solids dispersion of carbon black in alcohol (Alcoblak B, Borden Chemical Co.), 15 grams of polyvinyl butryal (Butvar B-90), 4 grams of 40-weight castor oil, and 4 grams polyoxyethylene aryl ether (Pycal 94) in 100 grams of methanol. The polyvinyl butyral has an average molecular weight of 38,000-45,000, a viscosity of 600-1200 centipoises, and in approximate proportions by weight, 80% of polyvinyl butyral, 18-20% of polyvinyl alcohol, and 0-1% of polyvinyl acetate. The resulting dispersion is coated in a wet thickness of 8 mils on a release sheet of medium white paper coated on both sides with polyethylene for dimensional stability, and coated with a silicone release agent (Poly Slik S/S No. 8053, H. P. Smith Paper Co.). The coated sheet is air-dried at about 20° C. for 4 hours, to a dry film thickness of 0.8 mil.

A pressure-sensitive adhesive coating composition of water-dispersible polyvinyl acetate in aqueous dispersion (Borden Chemical Co.) is coated on a release sheet of the foregoing composition (Poly Slik S/S No. 8053), to provide a dry adhesive layer about 1 mil thick on the release sheet. The black polyvinyl butyral film and the adhesive layer are laminated together, by supplying them together on their release sheets to the nip between two pressure rollers. The release liner on the black polyvinyl butyral film is stripped therefrom.

The resulting black polyvinyl butyral film-adhesive layer lamination is laminated to the liquid crystal film, by supplying them on their release sheets to the nip between two pressure rollers at 80° C. The resulting laminate has the appearance of the laminate 10 of FIG. 1, wherein the release sheet 16 is a silicone-coated or polyvinyl alcohol-coated clear polyester release sheet, and the release sheet 18 is a silicone-coated sheet of paper coated on both sides with polyethylene.

Initially, the laminate in finished form can be used in that form to check temperatures in the 30°-33° C. range, by observing color changes through the clear polyester release sheet. For application to surface contours, such as on the skin, the release sheet 18 is peeled off of the adhesive layer 24, and the remainder of the laminate is applied to the skin in the manner described above. The release sheet 16 is removed, and the thin (2.8 mil thick) discrete flexible indicator component 12, composed of the liquid crystal film 20, the light-absorptive protective layer 22, and the adhesive layer 24, conforms intimately to the surface contours. After use, the indicator component 12 is removed and discarded, it being extremely difficult to retain in original form at this time, so that it cannot be reused.

EXAMPLE 2

In forming a liquid crystal film, a 40-gram quantity of a liquid crystal mixture is dissolved in 20 grams of toluene at 80° C. The mixture contains, in percent by weight, 56% of cholesteryl nonanoate (CN) and 44% of cholesteryl oleyl carbonate (COC), the mixture having a mesophase temperature range of 31°-32° C. To the solution is added a 100-gram quantity of acrylic resin, 40% solids in toluene (Acryloid B-66, Rohm & Haas Co.). The resulting liquid crystal-polyacrylate polymer solution is knife-coated in a wet thickness of 8 mils on a release sheet of medium white paper coated on both sides with polyethylene, and coated with a silicone release agent (Poly Slik S/S No. 8053, H. P. Smith Paper Co.). The coated release sheet is air-dried at about 20° C. for 24 hours, and oven-dried at 60° C. for 8 hours to drive off residual solvent. The resulting liquid crystal film layer has a thickness of 0.7 mil.

A 3-gram quantity of a 60% solids dispersion of carbon black in ethanol (Alcoblak B, Borden Chemical Co.) is dispersed in a 100-gram quantity of the foregoing acrylic resin (Acryloid B-66), with high shear agitation over a period of one hour. The dispersion is coated in a layer having a wet thickness of 5 mils over the exposed surface of the dry liquid crystal film. The coated product is air-dried for 25 hours at about 20° C., to provide a black light-absorptive protective coat having a dry thickness of 0.4 mil.

A pressure-sensitive adhesive is laminated to the black acrylic layer, in the same manner and employing the same adhesive-coated release sheet as described in Example 1. The resulting laminate has the appearance of the laminate 10 of FIG. 1, and is used to indicate temperatures in the range of 31°-32° C. Both release sheets are removed from the laminate for using the indicator component thereof.

EXAMPLE 3

A liquid crystal coating composition for preparing an elastic liquid crystal film is prepared in the same manner as described in Example 1, except that a different liquid crystal mixture is employed, and a dye mixture is incorporated to provide a light-absorptive background in the liquid crystal film. The liquid crystal mixture contains, in percent by weight, 56% cholesteryl nonanoate (CN), 35% cholesteryl oleyl carbonate (COC), and 9% cholesteryl benzoate (CBz). The dye mixture contains, in percent by weight of the liquid crystal mixture, 0.2% D&C Violet 2, 0.1% D&C Red 17, and 0.1% D&C Yellow 11. The liquid crystal mixture is heated to 80° C., and the dye mixture is dissolved therein during a mixing period of one hour.

The resulting liquid crystal coating composition is knife-coated in a wet thickness of 12 mils on a release sheet of an opaque blue high-density linear polyethylene sheet of 5 mils thickness coated with silicone (H. P. Smith Paper Co.). The coated release sheet is air-dried at about 20° C. to a dry liquid crystal film thickness of 1.2 mils.

A pressure-sensitive adhesive layer is laminated to the liquid crystal film on the exposed surface thereof, employing the adhesive-coated release sheet of Example 1 and supplying the two coated release sheets to the nip between two pressure rollers. The resulting laminate has the appearance of the laminate 42 of FIG. 2. Both release sheets are removed for using the indicator component of the laminate, with the adhesive layer applied to a surface to be tested.

EXAMPLE 4

In preparing a liquid crystal film having a polyurethane polymer matrix, a 60-gram quantity of the dyed liquid crystal mixture of Example 3 is thoroughly mixed with 79 grams of a polyether-amine base polyol mixture (Conathane TU 50A, part b; Conap, Inc.). A 100-gram quantity of a toluene diisocyanate polyether base prepolymer (Conathane TU 50A, part a) is added to the mixture and thoroughly mixed therein, followed by degassing in a vacuum system.

The mixture is coated in a layer 1.5 mils thick on a release sheet of a 5 mil polystyrene sheet coated with silicone release agent. Following an initial cure period of 24 hours, the adhesive-coated release sheet of Example 1 is employed for laminating its adhesive layer to the liquid crystal-polyurethane film. The film is cured for an additional 6 days. The resulting laminate has the appearance of the laminate 42 of FIG. 2, and the indicator component 44 thereof has a total thickness of 2.5 mils and is very elastic. In use, both of the release sheets are removed, and the adhesive layer is affixed to a surface, as described above.

EXAMPLE 5

A liquid crystal-polyurethane-coated release sheet is provided as in Example 4. After twelve hours of initial cure, another release sheet of the same type is pressure-laminated to the exposed surface of the resulting liquid crystal film. The film is cured for an additional seven days.

The resulting laminate has the appearance of the laminate 60 of FIG. 3, and is employed as described above. After removing the release sheets, the liquid crystal film may be attached to any desired surface or instrumentality in a suitable manner. When one of the surfaces 72 and 74 is to be placed against the surface of an object to be tested, the surface of the object may be sprayed with an oil-free adhesive, serving to adhere the film to the object, or the film may be taped in place in appropriate instances.

We claim:

1. A liquid crystal film laminate which comprises an indicator component and a supportive and protective component removable therefrom, said indicator component including a discrete flexible liquid crystal film having an outer surface which forms one of two opposite side surfaces on the component, said film comprising a film-forming polymer matrix having a cholesteric liquid crystalline phase material dispersed therein for providing a visible response to the application of energy, said supportive and protective component including two release surfaces provided by at least one release sheet, said release surfaces separably contacting respective ones of said indicator component side surfaces in covering relation thereto for removably supporting and protecting the indicator component, said outer surface of the film thereby being exposed directly to the atmosphere to provide an unobstructed view of the surface upon removal of said supportive and protective component.

2. A laminate as defined in claim 1 and wherein said indicator component also includes a flexible adhesive layer having a surface which forms the remaining one of said side surfaces.

3. A laminate as defined in claim 1 and wherein said indicator component also includes a flexible protective layer formed of a film-forming polymer and contacting an inner surface of said film.

4. A laminate as defined in claim 3 and wherein said protective layer includes a light-absorptive substance dispersed in a matrix of the polymer which forms the layer.

5. A laminate as defined in claim 4 and wherein said indicator component further includes a flexible adhesive layer having a surface which forms the remaining one of said side surfaces.

6. A laminate as defined in claim 1, 2, 3, 4, or 5 and wherein the maximum total thickness of said indicator component is about 4 mils.

7. A laminate as defined in claim 6 and wherein said film has a thickness of about 0.2–4 mils.

8. A laminate as defined in claim 1 in flat form, and wherein said release surfaces are the inside surfaces of two release sheets disposed on opposite sides of said indicator component.

9. A laminate as defined in claim 8 and wherein each of said release sheets comprises a flexible member selected from the group consisting of cellulosic sheets, film-forming polymer sheets, and laminates of cellulosic sheets and film-forming polymer sheets, and a release agent on said member.

10. A laminate as defined in claim 1 in roll form, and wherein said release surfaces are the opposite side surfaces of a single release sheet disposed on the outside and contacting the inside of the indicator component as rolled.

11. A laminate as defined in claim 10 and wherein said release sheet comprises a flexible member selected from the group consisting of cellulosic sheets, film-forming polymer sheets, and laminates of cellulosic sheets and film-forming polymer sheets, and a release agent on said member.

12. A laminate as defined in claim 1 and wherein said film-forming polymer is selected from the group consisting of polyvinyl butyral, polyurethane, and an acrylic resin, and said material comprises finely divided naked aggregates which are dispersed in said matrix.

13. A laminate as defined in claim 8, 9, 10, 11, or 12 and wherein the maximum total thickness of said indicator component is about 4 mils.

14. A laminate as defined in claim 13 and wherein said film has a thickness of about 0.2–4 mils.

15. A liquid crystal film laminate which comprises an indicator component and a supportive and protective component removable therefrom, said indicator component having a maximum total thickness of about 4 mils and including, in successive contacting layers:

(a) a discrete flexible liquid crystal film having a thickness of about 0.2–2 mils and comprising a film-forming polymer matrix having a cholesteric liquid crystalline phase material in the form of finely divided naked aggregates dispersed therein for providing a visible response to the application of energy;

(b) a flexible light-absorptive protective layer having a thickness of about 0.1–2 mils and comprising a film-forming polymer matrix having a light-absorptive substance dispersed therein; and (c) a flexible adhesive layer having a thickness of about 0.1–2 mils;

said film and said adhesive layer each having a surface which forms one of two opposite side surfaces on the indicator component, said supportive and protective component including two release surfaces provided by at least one release sheet, said release surfaces separably contacting respective ones of said indicator component side surfaces in covering relation thereto for removably supporting and protecting the indicator component, said film surface thereby being exposed directly to the atmosphere to provide an unobstructed view of the surface upon removal of said supportive and protective component.

16. A laminate as defined in claim 15 and wherein the film-forming polymer of said film is selected from the group consisting of polyvinyl butyral, polyurethane, and an acrylic resin.

* * * * *